United States Patent Office 3,175,151
Patented Mar. 23, 1965

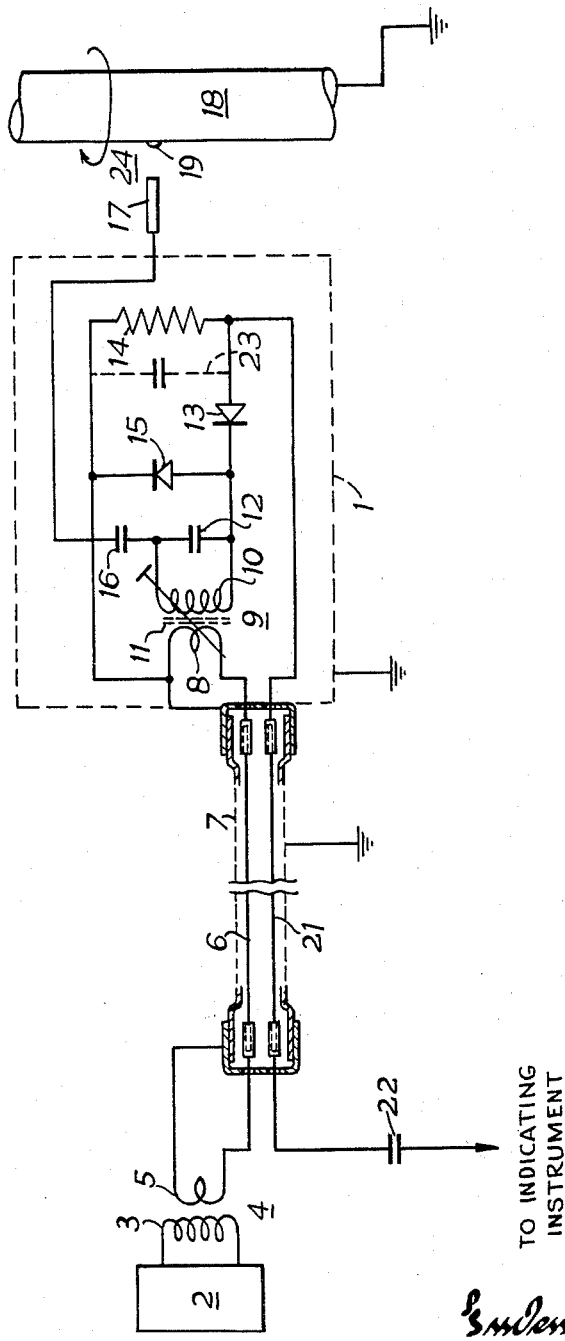

3,175,151
ELECTRICAL CIRCUIT MEANS FOR SENSING AN INTERMITTENT CHANGE IN CAPACITY BETWEEN A PROBE AND EARTH
George William Gurry, Leyton, London, England, assignor of one-half to Bertram McCarthy, London, England
Filed May 18, 1960, Ser. No. 29,916
Claims priority, application Great Britain, May 21, 1959, 17,308/59
4 Claims. (Cl. 324—60)

This invention relates to electrical circuit means for sensing a change in capacity between a probe and earth.

According to the present invention, electrical circuit means for sensing a change in capacity between a probe and earth, comprise alternating voltage input means having in series connection therewith a first rectifying means, a first or reservoir capacitor and a second or probe capacitor consisting of the capacity between a probe and earth, and a second rectifying means in parallel connection with the series path formed by the reservoir capacitor and the first rectifying means, the arrangement being such that, during operation, in one half cycle of the input voltage the series path comprising the first and second capacitors and the first rectifying means is connected to the alternating voltage input means thereby charging the first and second capacitors, whilst, in a succeeding half cycle of the input voltage, the second capacitor is discharged by connection thereof in series with the second rectifying means to the alternating voltage input means, whereby variation of the capacity of the second capacitor for an interval of time substantially greater than the periodic time of the input voltage causes variation in the voltage level of the first capacitor.

Advantageously, a first resistor is provided and disposed in parallel connection with the reservoir capacitor so that when the second capacitor is being discharged, the first capacitor is only partially discharged.

Suitably, the input voltage is derived from an oscillator, an output transformer of which includes a secondary winding connected by means of a first conductor of a cable to a primary winding of an input transformer which constitutes the alternating voltage input means of the circuit. The cable also includes a second conductor for supplying the output voltage of the reservoir capacitor to a suitable indicating instrument. The cable may be of appreciable length to permit operation of the probe remotely from the oscillator and when the probe is so operated, the reservoir capacitor may comprise the self-capacitance of the cable.

The invention will now be described, by way of example, with reference to the accompanying drawing which illustrates electrical circuit means for sensing a change in capacity between a probe and an earthed rotating shaft for the purpose of measuring the shaft speed.

Referring to the drawing electrical circuit means housed within an earthed container 1 which is shown in broken lines are supplied with an input voltage derived from an oscillator 2 which is operated at a fixed frequency of, for example, 1.5 megacycles per second. The output of the oscillator is developed across a primary winding 3 of a transformer 4 having a secondary winding 5 connected at opposite ends thereof to earth and to a conductor 6 in a cable 7 having an earthed sheath. The end of conductor 6 remote from the winding 5 connects with one end of a primary winding 8 of an input transformer 9 of the electrical circuit means in the housing 1. The end of primary winding 8 remote from conductor 6 is earthed. A secondary winding 10 of input transformer 9 which is tunable by means of an iron dust core 11 is shunted by a tuning capacitor 12.

One end of the secondary winding 10 is connected in series with a first rectifier means 13, suitably, a germanium diode and a resistor 14, the end of resistor 14 remote from the first rectifier means 13 being earthed. In parallel with the first rectifier means 13 and the resistor 14 is connected a second rectifier means 15 also, suitably, in the form of a germanium diode.

The end of the secondary winding 10 remote from the first rectifier means 13 is connected by way of a D.C. blocking capacitor 16 with a probe 17 which projects from the casing 1 and is firmly held a fixed distance from a rotatable shaft 18 which is earthed and which is formed with an irregularity here indicated as a projection 19 which, during each rotation of the shaft passes once past the probe 17.

The end of the resistor 14 adjacent rectifier means 13 is the point of the circuit from which the output voltage is taken and to this end is connected to a conductor 21 of cable 7 which in turn is connected by way of a D.C. blocking capacitor 22 to an indicating instrument (not shown).

The self-capacitance of cable 7 constitutes effectively a first or reservoir capacitor 23 which shunts the resistor 14 whilst the probe 17 and shaft 18 constitute a second or probe capacitor 24 the capacitance of which varies each time the irregularity 19 traverses the free end of probe 17. The value of the first or reservoir capacitor 23 is of the order of 200–300 pfd. and that of the second or probe capacitor is of the order of one pfd.

During operation, when a negative going half-cycle of voltage appears across the winding 10 of the input transformer 9, current flows in the series path comprising capacitors 16, 24, 23 and rectifier means 13 with the result that these capacitors are charged. During a succeeding positive going half-cycle current flows in the opposite sense in the series path comprising rectifier means 15 and capacitors 24 and 16. Thus capacitors 24 and 16 are discharged. However, during this half-cycle the charge on capacitor 23 is permitted to leak away only gradually through resistor 14 because of the time constant of resistor 14 and capacitor 23. It will be apparent therefore that if the capacitance of the probe capacitor 24 were constant, a substantially constant level of voltage would be established at capacitor 23. However, because of the irregularity 19 on the shaft 18 the capacitance of capacitor 24 changes once per revolution of shaft 18 for the period of time whilst the irregularity traverses the probe 17. Thus once per revolution of the shaft 18 the standing voltage level on capacitor 23 changes and the voltage at capacitor 23 comprises effectively a D.C. voltage on which are superimposed pulses the frequency of which is a measure of the revolutions per second of the shaft.

The train of impulses superimposed on the D.C. voltage level of reservoir capacitor 23 may be employed to provide a meter indication of the shaft speed. To this end, the voltage across the reservoir capacitor is supplied by way of D.C. blocking capacitor 22 to an instrument (not shown) including an amplifier, the amplified output voltage of which is supplied to a trigger circuit which in turn operates a square pulse generator, the output pulses of which are supplied to a frequency meter in order to obtain a visual indication of the shaft speed.

The speeds of bodies other than rotating shafts may readily be ascertained by means of the invention described. For example, the probe may be disposed at a predetermined distance from a body vibrating transversely with respect to the probe so that a deformation on the vibrating body periodically traverses the probe. Alternatively, the speed of a series of falling bodies may be ascertained and in this instance the probe is disposed at a predetermined distance from a fixed plate and the falling bodies are directed between the probe and the fixed plate.

By utilisation of the novel circuit described, which is intended mainly for use in connection with ascertaining the speeds of rotating shafts, shaft speed can be determined in a simple and expeditious manner and irrespective of whether the shaft is rotating in oil or any other non-conductor. The speed measurement is unaffected by the temperature of the shaft and involves no imposition of load on the shaft. Shaft speeds upwards of 300,000 r.p.m. are measurable by use of this invention.

The electrical circuit means described has many applications outside the measurement of shaft speeds. Thus, for example, the circuit may be used to give an indication of the level of material in a container. For this purpose, the casing 1 is positioned with the probe 17 directed towards the level of material within a container and the voltage across the reservoir capacitor varies in accordance with the level of material in the container.

The circuit means may also be used for the counting and batching of objects on a conveyor system. In this application, the casing 1 would be positioned above the moving belt on which objects were being conveyed and each time an object passed under the probe 17 a voltage pulse would appear in the standing voltage level across the reservoir capacitor, the voltage pulses being counted in known manner.

A further application of the circuit means according to the invention is to the measurement of the velocity of moving objects. To this end two electrical circuit means according to the invention are spaced a measured distance apart so that a start and stop pulse is obtained respectively from the reservoir capacitors of the circuit means as the object successively passes the spaced probes. The start and stop pulses are then supplied to a chronometer which can be calibrated to give an indication of velocity.

Yet another application of the invention is to the control of tension is a moving band of flexible material. In this instance the probe is positioned adjacent the band and if the tension in the band slackens a voltage change is obtained at the reservoir capacitor which can be utilised to energise means for restoring the requisite tension to the band.

What I claim is:

1. Electrical circuit means for sensing a change in capacity between a probe and earth, comprising a first capacitor, a second capacitor consisting of the said probe and an element which, in operation of the circuit means, is maintained at earth potential, a first rectifying means connected in series circuit with the first and second capacitors, alternating voltage input means arranged to apply an alternating voltage across the series circuit, the frequency of the said alternating voltage being much larger than the repetition frequency of the changes in capacity to be sensed in the second capacitor, resistance means connected in parallel with the first capacitor and of such a high value that the time constant of the parallel combination of the first capacitor and the resistance means is large compared with the periodic time of the said alternating voltage, and second rectifying means connected in parallel only with the part of the series circuit formed by the first capacitor and the first rectifying means, the first and second rectifying means being arranged with opposite polarities relative to that part of the circuit, whereby while the second capacitor has an unchanging capacitance the second capacitor is cyclically charged, discharged and charged with reversed polarity at the frequency of the alternating voltage, while the first capacitor is charged unidirectionally only by alternate half cycles of the alternating voltage and tends to discharge at a relatively slow rate through the resistance means, thereby attaining a relatively steady state of charge, and upon a change in the capacitance of the second capacitor the first capacitor drifts to a different relatively steady state, and measuring means coupled to the first capacitor and sensitive to the state of charge of the first capacitor to provide an indication of the changes in the capacitance of the second capacitor.

2. Electrical circuit means according to claim 1, in which an input transformer comprises the alternating voltage input means, a secondary winding of the transformer is connected in the series circuit, and an oscillator is connected to energise a primary winding of the transformer.

3. Electrical circuit means according to claim 1, in which one end of the resistance means is connected to earth, the other end of the resistance means is connected to the measuring means through a conductor of a screened cable, the screen of the cable is connected to earth, and the first capacitor consists of the conductor and the screen.

4. Electrical circuit means according to claim 1, in which the measuring means provides an indication of the repetition rate at which the capacitance of the second capacitor changes.

References Cited by the Examiner
UNITED STATES PATENTS

| 2,232,959 | 2/41 | Miller | 324—70 |
| 2,766,428 | 10/56 | Sippach | 324—60 |

FOREIGN PATENTS

| 678,204 | 7/39 | Germany. |
| 720,151 | 12/54 | Great Britain. |

WALTER L. CARLSON, *Primary Examiner.*
LLOYD McCOLLUM, *Examiner.*